United States Patent [19]

Takei

[11] Patent Number: 5,127,680
[45] Date of Patent: Jul. 7, 1992

[54] PIPE JOINT STRUCTURE

[76] Inventor: Norio Takei, 19-24, Mita 4-Chome, Minato-Ku, Tokyo, Japan

[21] Appl. No.: 639,234

[22] Filed: Jan. 9, 1991

[30] Foreign Application Priority Data

Jan. 23, 1990 [JP] Japan .................................. 2-11758

[51] Int. Cl.$^5$ ............................................. F16L 9/14
[52] U.S. Cl. ...................... 285/94; 285/49; 285/382; 285/291; 285/915
[58] Field of Search ............... 285/321, 915, 294, 291, 285/49, 382, 94

[56] References Cited

U.S. PATENT DOCUMENTS

| | | | |
|---|---|---|---|
| 3,228,425 | 1/1966 | Pacella | 285/291 X |
| 3,830,530 | 8/1974 | Glover | 285/915 X |
| 4,116,478 | 9/1978 | Yamaji et al. | 285/321 X |
| 4,673,198 | 6/1987 | Pritchatt | 285/915 X |
| 4,732,412 | 3/1988 | Van der Linden | 285/294 X |

FOREIGN PATENT DOCUMENTS 1256004 12/1967 Fed. Rep. of Germany ...... 285/915

OTHER PUBLICATIONS

Application of FRPM and FRP Pipes to Reforming of Spillways Straub Coupling.
Locking Line Coupler Kinds and Uses of Rapid Fluid Joints.

Primary Examiner—Dave W. Arola
Attorney, Agent, or Firm—Young & Thompson

[57] ABSTRACT

A pipe joint structure is disclosed. An inscribing joint pipe 2 is fixed to an inner peripheral surface at an end portion of a first pipe 1a, while being projected slightly outwardly from the axial end of the pipe 1a. A stopper ring 15 is fixed onto the outer peripheral surface of the pipe 1a at a location slightly spaced from the axial end thereof. An annular engaging notch 11 is formed in the outer peripheral surface near the stopper ring or an annular engaging ring 11' is inserted around the end portion of the pipe 1a and fixed near the stopper ring. A circumscribing reinforcing pipe 3a, 3b are fixed to an outer peripheral surface at an end portion of the other pipe 1b to be joined to the pipe 1a, while being projected slightly outwardly from the axial end of the pipe 1b. The circumscribing reinforcing pipe is provided with an engaging ring 10 at its tip end portion to engage the annular engaging ring 11 or a remote end of the annular fitting ring from the other pipe 1b in the state that the pipes 1a and 1b are joined together. Plural projections 4a, 4b are formed on the inner peripheral surface of the other pipe 1b near the axial end of the pipe 1a. A cover tape 9 with a pressure-sensitive adhesive 8 is provided around the outer periphery of the pipe 1a at location from the stopper ring 15 toward the end thereof. A pressure-sensitive adhesive layer 5 and a reinforcing cloth 6 are attached to the inner peripheral surface of the pipe 1b inclusive of the circumscribing reinforcing pipe 3a, 3b from the engaging ring 10 at the circumscribing reinforcing pipe 3a, 3b. The reinforcing cloth 6 is impregnated with a lubricant having plasticity to the pressure-sensitive adhesive. When the pipe is joined, the adhesive layer 5 and the reinforcing layer 6 are interposed between joining surfaces of the pipe 1a, 1b joined through the circumscribing reinforcing pipe 3a, 3b and the inscribing joining pipe 2.

4 Claims, 9 Drawing Sheets

FIG.2a  FIG.2b

FIG_4a

FIG_4b

FIG_6

PIPE JOINT STRUCTURE

BACKGROUND OF THE INVENTION

1. Field of the Invention

The present invention relates to a pipe joint structure and a technique for readily joining pipes in a pipe line. More particularly, the invention relates to a novel pipe joint structure for butt joining ends of pipes in a pipe line to be use in transportation of water for hydroelectric power generation, transportation of service water or sewage, and transportation of mineral slurry or corrosive fluid, and also relates to a technique for collectively joining pipes provided with such pipe joint structures in the pipe line.

2, Related Art Statement

Heretofore, as pipe joints for line pipes, (1) welded joints, (2) flange joints, and (3) mechanical joints are recited.

In the case of the welded joint (1), since ends of pipes need to be directly joined at a construction site by welding, this technique required a great deal of skill. Further, since the welded joint needs to be inspected by X rays and repaired by coating, it takes a long time for the joining (about 5 hours per one joint in the case of 800 mm diameter pipes).

The flange joint (2) is unsuitable for buried pipes liable to be exposed to uneven sinking, because the flange joint is more expensive and has lower resistance against bending moment as compared with the welded joint.

The mechanical joint (3) is better than the joints (1) and (2) in that the former has easy to work, and has appropriate elongation and flexibility at the joined portion. However, the mechanical joint has the following defects. That is, the mechanical joint is more costly than the welded joint. The sealingness of the mechanical joint is gradually deteriorated, and fracture of the rubber ring or deassembling of the joint tend to more frequently occur particularly on earthquakes.

Figure 9:
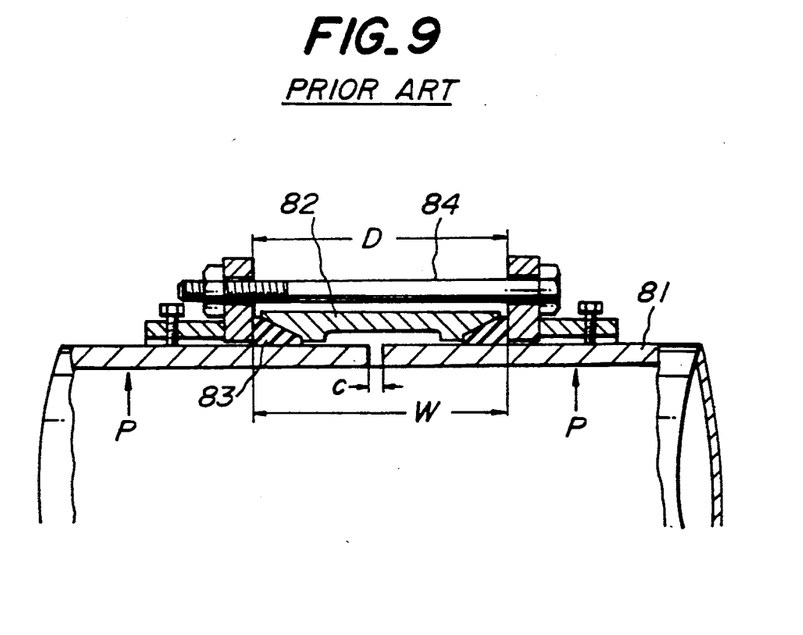
FIG. 9 is a view of schematically illustrating the conventional mechanical joint.

FIG. 9 shows a conventional mechanical joint. When an internal pressure P is applied inside pipes 81 and 81 of this joint, the pressure is also ordinarily imparted upon a middle ring (outer cylindrical pipe) 82 and a rubber packing 83. Therefore, the internal pressure acts upon the middle ring 82 over a width equal to an outer width W of the rubber packing 83. Consequently, the joint must be designed to sufficiently withstand such a pressure. Further, in order to also withstand the above internal pressure, metal fixtures for the rubber packing 83 must be tightened by a number of bolts and nuts 84. Owing to this, the structure becomes complicated, resulting in a high cost.

In addition, the joint portion needs to be essentially sealed only at an expansion-contraction gap C in FIG. 9.

Incidentally, the conventional mechanical joint is based on a way of thinking that the joined portion itself freely slides on vibrations in large earthquakes. For this reason, the above width W is made so large that the joined pipes will not be slipped off from the joined portion even upon receipt of great vibrations.

Moreover, since a sliding surface to the rubber packing 83 in the conventional mechanical joint may be brought into contact with the fluid, the sliding surface is covered with an anti-corrosive paint such as an epoxy paint. However, the sliding surface is often rusted through abrasion of the coat film due to vigorous sliding or heaping of earth and sand on the sliding surface. When the rusted portion has gradually spread, the rubber packing is broken by a rusty mass or earth and sand to cause leakage upon receipt of great vibrations such as earthquake.

On the other hand, when the sliding surface to the rubber packing 83 is rusted to make the sliding resistance greater, that part of the joined portion which has a relatively smaller sliding resistance is concentratedly displaced on earthquake, so that the joint may in its turn be disassembled or the like. As mentioned above, even when the width W of the joined portion is made greater, great variations occur in the sliding resistance varies if the sliding surface is rusted. Ultimately, the intended effects cannot be realized.

SUMMARY OF THE INVENTION

It is an object of the present invention to provide a pipe joint structure which can overcome the above-mentioned problems possessed by a variety of conventional pipe joint structures.

Upon repeatedly made strenuous studies to realize the above object, the present inventor has reached an effective solution having the following features as its gist.

That is, the present invention has developed the pipe joint structure characterized in that: an inscribing joint pipe 2 is fixed to an inner peripheral surface at an end portion of one of pipes to be joined together, 1a, while one end of the inscribing joint pipe 2 is projected slightly outwardly from the axial end of the pipe; a stopper ring 15 is fixed onto the outer peripheral surface of the pipe 1a at a location slightly spaced from the axial end thereof; an annular engaging notch 11 is formed in the outer peripheral surface near the stopper ring or an annular engaging ring 11' is fitted around the end portion of the pipe 1a and fixed near the stopper ring; a circumscribing reinforcing pipe 3a, 3b is fixed to an outer peripheral surface at an end portion of the other pipe 1b to be joined, while end portions of the circumscribing reinforcing pipe 3a, 3b is projected slightly outwardly from the axial end of the other pipe 1b; the circumscribing reinforcing reinforcing pipe is provided with an engaging ring 10 at its tip portion to engage the annular engaging ring 11 or a remote end of the annular fitting ring 11' in the state that the pipes 1a and 1b are joined together; a plurality of annular projections are provided on the inner peripheral surface of the other pipe 1b near the axial end thereof; a cover tape 9 having a pressure-sensitive adhesive 8 is provided around the outer periphery of the pipe 1a at a location from the stopper ring 15 toward the end thereof; a pressure-sensitive adhesive layer 5 and a reinforcing cloth 6 are attached to the inner peripheral surface of the pipe 1b inclusive of the circumscribing reinforcing pipe 3a, 3b from the engaging ring 10 at the circumscribing reinforcing pipe 3a to the pipe 1b beyond the annular projections 4a, 4b; and the reinforcing cloth 6 is impregnated with a lubricant having plasticity to the adhesive, wherein when the pipe is joined, the pressure-sensitive adhesive layer 5 and the reinforcing layer 6 are interposed between joining surfaces of the pipe 1a, 1b joined through the circumscribing reinforcing pipe 3a, 3b and the inscribing joining pipe 2.

Figure 7:
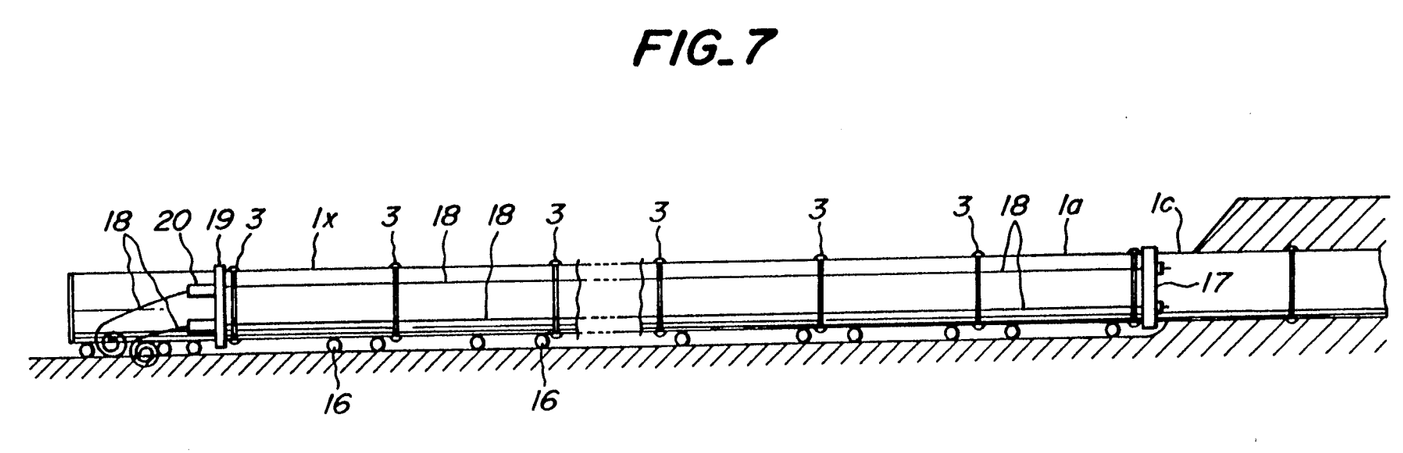
FIGS. 7 and 8 are views schematically illustrating methods of joining the pipes according to the present invention.

A pipe line can be constructed by using the above pipe joint structures as shown in FIG. 7. That is, when the pipe line is to be constructed by butt joining a number of pipes having the above pipe joint structures together, a base pipe is fixed, and a plurality of other pipes to be joined to the base pipe are successively placed along the line. A jack-tractable wire fixing member 17 is fitted to one end of one of extreme right and left pipes, and a plurality of wires 18 are fixed to the fixing member 17 at one ends. The other ends of the wires 18 are extended to a remoter end of the other one of the extremely right and left pipes, and connected to jacks 20 through a jack-fixing member 19. A number of the pipes preliminarily arranged are joined together once with their ends being engaged with one another by drawing in the wires 18 with the jack 20.

The conventional mechanical joint is constructed such that the joint easily vibrates and the rubber packing is freely slidable against vibrations such as earthquake. In such a structure, since the slidable length between the joint and the pipes must be made larger, the weight of the joint structure becomes accordingly greater. Further, when the sliding surface is rusted, it happens that the rubber ring is damaged or the joint is disassembled.

In view of this, the first feature of the present invention is that high viscosity adhesive having high viscosity is filled in an expansion-contraction portion of the joint, and the above-mentioned problems are overcome through adsorption of vibrations by utilizing the viscoelasticity effect (Rheology).

That is, since the pressure-sensitive adhesive is used for the joint structure according to the present invention, the adhesive flows as a liquid to mitigate stresses against the expansion and contraction of the pipes due to changes in temperature and angular displacement due to uneven sinking or bending moment at low speeds, so that occurrence of thermal stresses is prevented.

On the other hand, the pressure-sensitive adhesive does not almost flow against rapid displacement such as earthquake, so that the adhesive is elastically displaced to produce great stresses in the joined portion. In this case, the mechanical energy of the earthquake is converted to the thermal energy by internal frictional forces (flow resistance) of the pressure-sensitive adhesive, which is dissipated. Furthermore, since the vibrations are controlled in this way, occurrence of the disassembling of the joint as may frequently occur in the case of the mechanical joint can be prevented.

Since the joint structure according to the present invention is constructed (as an anti-vibrating structure) as mentioned above, the expansion-contraction gap C in the above pipe joint structure may be limited to cope with the expansion and contraction of the pipes due to changes in temperature or an angular displacement due to uneven sinking and geographical changes.

The second feature of the present invention is that the joint structure is structurally partially integrated with the pipe bodies, the internal pressure and the external pressure applied to the joint are also shared by the ends of pipes, and the reinforcing structure is employed for the ends of the pipes to withstand the shared pressure.

Since the conventional mechanical joint is so designed that the pipe and the joint may independently withstand the internal pressure, a useless portion exists from the above point of view. On the other hand, since the pipe and the joint are structurally integrated, such a useless portion is diminished.

In addition, the third feature of the present invention is that the joint structure employs the construction in which strains smaller than yield point are preliminarily applied, on joining, to the joint portion in directions reverse to the inner pressure and the outer pressure applied to the joint at the ends of the pipes, so that when the inner pressure and the outer pressure are applied, the stresses are offset, and that the joined portion has a self-sealing structure.

The fourth feature of the present invention is that a material having higher tension strength and greater higher yield strength and more excellent impact strength as compared with the pipe body is used as a structural material for the joint.

By employing the above mentioned four features, even when the structural materials 2 and 3 of the joint are sufficiently thinner as compared with the pipe body, the pipe joint structure can fully withstand the inner and outer pressures. As a result, the pipe joint structure can be automatically manufactured in the factory, light in weight, and simple in structure.

In the present invention, since the textile having fine voids into which the highly viscous pressure-sensitive adhesive is forcedly filled is used as the sealing material, the joint structure is advantageous in terms of cost, and has high self-sealability.

These and other objects, features and advantages of the invention will be appreciated upon reading of the description of the invention when taken in conjunction with the attached drawings, with the understanding that some modifications, variations and changes of the same will be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 4b is a perspective view of a part of the pipe joint structure, i.e., an engaging ring in FIG. 4a;

DETAILED DESCRIPTION OF THE INVENTION

Figure 1:
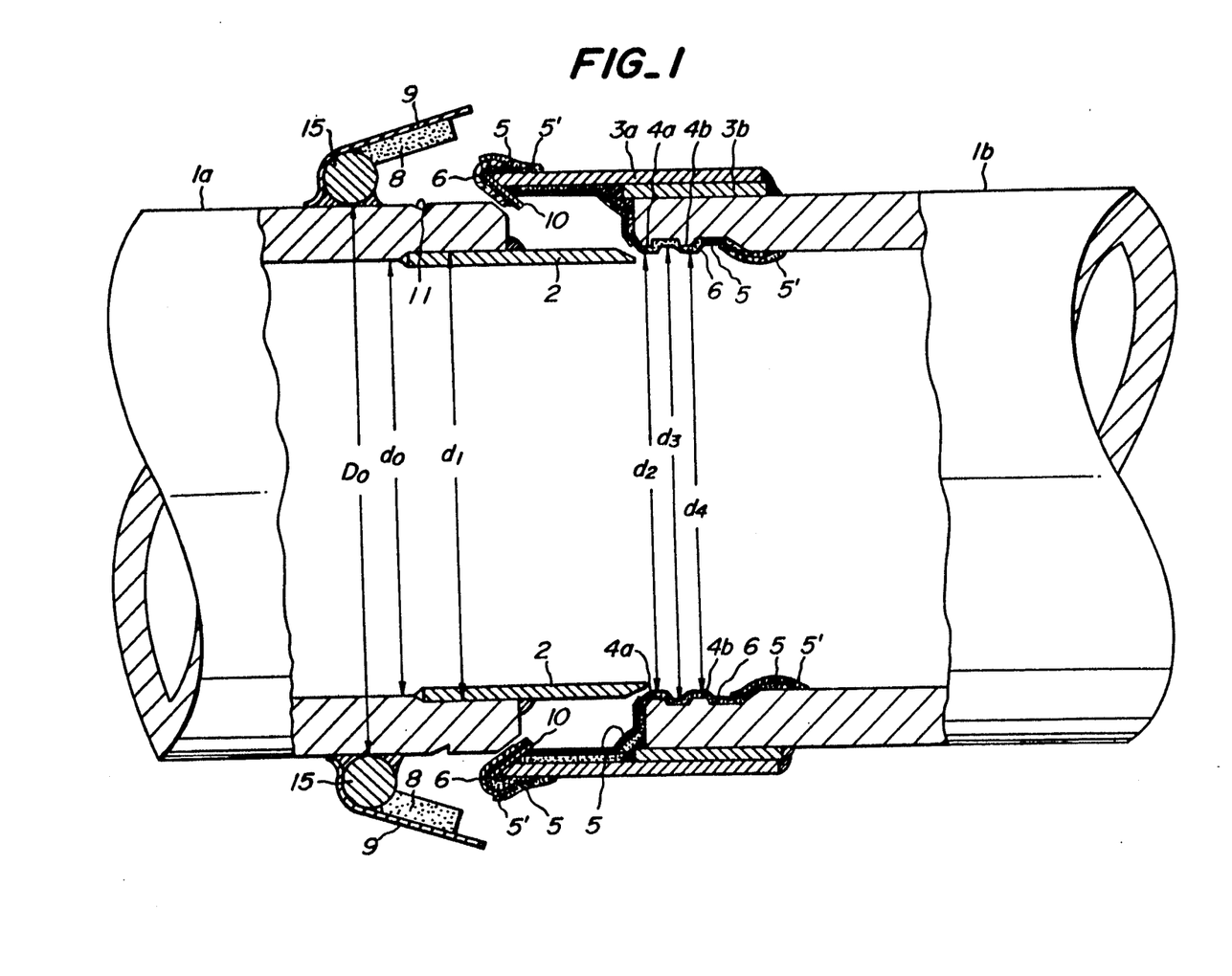
FIG. 1 is a partially broken sectional view of a pipe joint structure according to the present invention.

FIGS. 1 through 5 illustrate embodiments of the pipe joint structures according to the present invention constructed based on the above-mentioned fundamental constructing idea. Identical numerals denote the same or similar parts through FIGS. 1 to 5. FIG. 1 is a view of entirely illustrating two pipes 1a, 1b before the pipes 1a, 1b are butt joined.

Figure 2A:
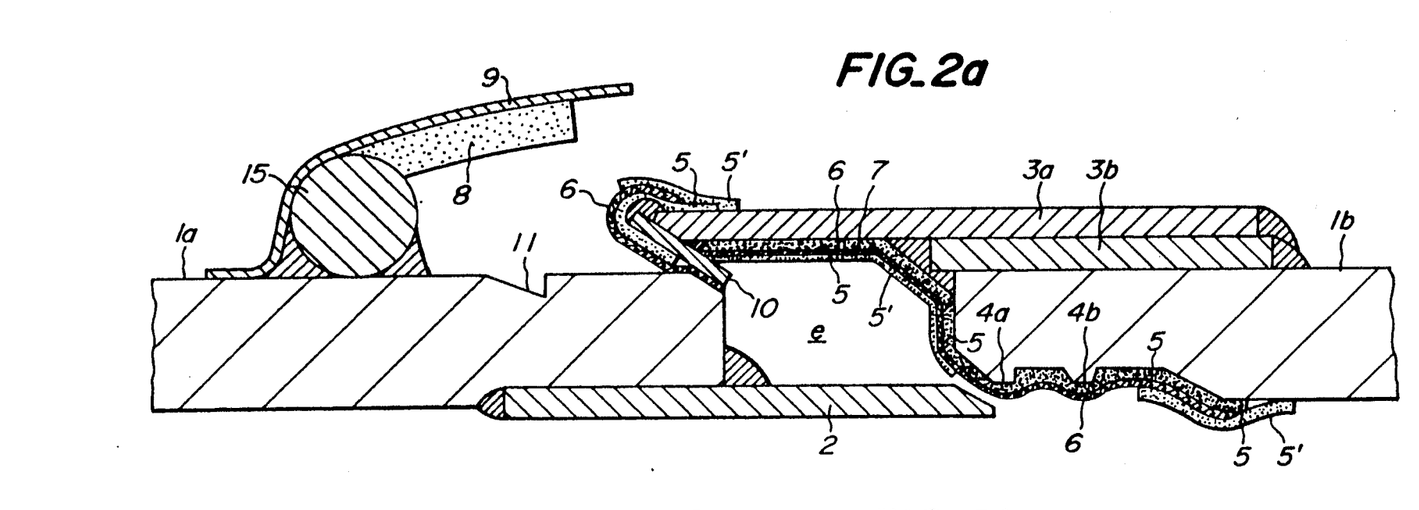
FIG. 2a is an enlarged view of a part of FIG. 1 before joining.
Figure 2B:
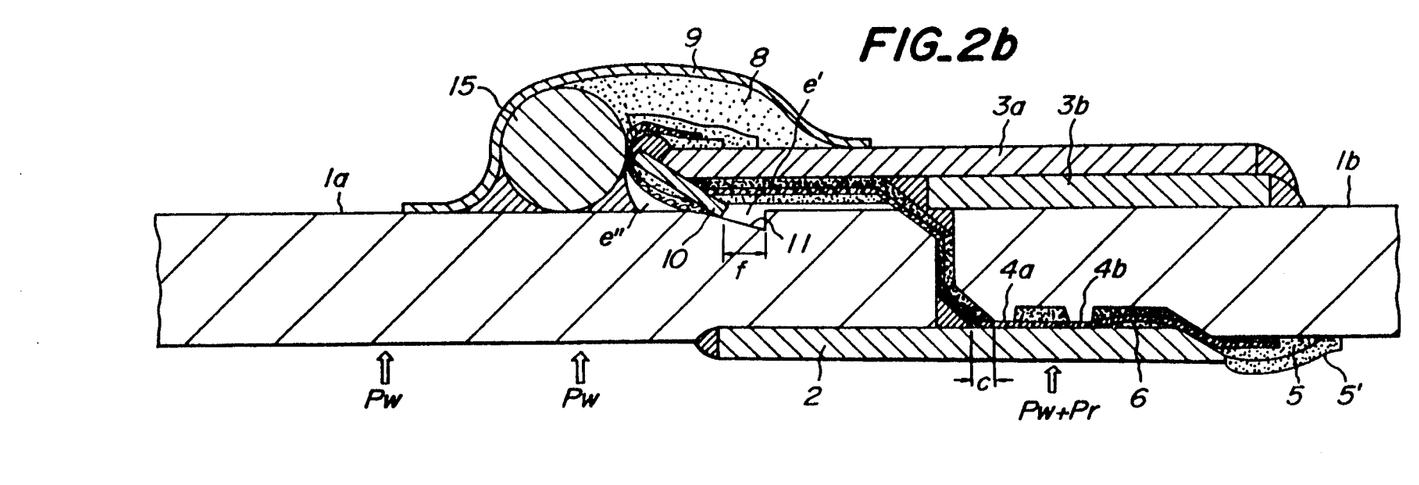
FIG. 2b is an enlarged view of a part of FIG. 1 in a joined state.

FIGS. 2a and 2b enlarged partial views of the joint.

In the pipe joint structure, an inscribing joint pipe 2 is fixed, by welding, to an inner peripheral surface at an end portion of one (1a) of pipes 1a, 1b to be joined, while one end (free end) of the inscribing joint pipe 2 is projected slightly outwardly from the axial end of the pipe 1a.

A stopper ring 15 is fixed onto the outer peripheral surface of the pipe 1a at a location slightly axially spaced from the axial end thereof. An annular engaging notch 11 is provided in the form of a saw tooth-like notch in the outer peripheral surface of the pipe 1a between the stopper ring 15 and the pipe end. The stopper ring 15 is covered with a covering tape 9 which possesses a pressure-sensitive adhesive on one surface for surrounding the end portion of the pipe 1a starting from the outer periphery of the stopper ring 15.

To the contrary, circumscribing reinforcing pipes 3a, 3b are fixed, by welding, to an outer peripheral surface at an end portion of the other pipe 1b to be joined, while end portions of the circumscribing reinforcing pipes 3a, 3b are slightly projected from the axial end of the pipe 1b. The circumscribing reinforcing pipe 3b is provided with an engaging ring 10 at its free end portion to engage the annular engaging notch 11 provided in the pipe 1a in the state that the pipes 1a and 1b are joined together. A plurality of annular projections 4a, 4b are formed on the inner peripheral surface (at such a location which overlaps with the free end of the inscribing joint pipe) of the pipe 1b at the end portion of the pipe 1b by providing a plurality of axially spaced annular grooves. A pressure-sensitive adhesive layer 5 is formed on the inner peripheral surfaces of the circumscribing reinforcing pipes 3a and 3b and the inner peripheral surface of the pipe 1b over the annular projections 4a, 4b by adhering an adhesive seal tape under pressure, while the adhesive layer is also provided to surround the engaging ring 10 fixed to the free end of the circumscribing reinforcement pipe 3a. An adhesive layer 5 is further formed to cover the outer peripheral surface of the engaging ring 10 by adhering the adhesive tape thereto under pressure. The adhesive tape has a pressure-sensitive adhesive on opposite surfaces. In addition, a reinforcing cloth 6 is provided along the seal tape 5. This reinforcing cloth 6 is impregnated with a lubricant having plasticity to the adhesive. In this embodiment, additional adhesive layers 5' are attached to the outer side of the adhesive layer 5 and the reinforcing layer 6 around the engaging ring 10, to the inner periphery of the adhesive layer 5 inside the reinforcing pipes 3a, 3b, and to the axially innermost periphery of the layers 5 and 6 inside the pipe 1b. That is, the layer 6 is exposed at portions to be brought into slide contact as that pipes 1a, 1b are being engaged together.

When the pipes 1a and 1b are joined, the pressure-sensitive adhesive is always interposed between the stopper ring 15 and the engaging ring 10, between the outer peripheral surface of the pipe 1a and the inner peripheral surfaces of the circumscribing reinforcing pipes 3a and 3b, between the end faces of the pipes 1a and 1b, and between the annular projections 4a and 4b constituting the inner peripheral surface of the pipe 1b and the inscribing joining pipe 2.

In the above construction, as to the end portions of the pipes 1a, 1b, the outer diameter of the inscribing joining pipe 2 of the pipe 1a is made slightly larger than the inner diameter of the annular projections 4a, 4b of the pipe 1a.

In such a joint structure, the pressure-sensitive adhesive layer is formed among the sealing surfaces of the circumscribing reinforcing pipes 3a, 3b, the inscribing joint pipe 2, and the pipes 1a, 1b and in their surrounding portions by adhering the sealing tape 5 having the pressure-sensitive adhesive at opposite surfaces under pressure, and as mentioned above, the reinforcing cloth 6 is attached to the surface of the pressure-sensitive adhesive tape 5. Therefore, when the pipes 1a, 1b are to be butted and fitted for the joining, the inscribing joining pipe 2 fixed to the pipe 1a is moved forward such that the lubricant impregnated into the reinforcing cloth 6 and the pressure-adhesive adhesive may be forwardly squeezed.

As a result, when the inscribing joint pipe 2 contacts the annular projections 4a, 4b at the end portion of the pipe 1b, the inscribing joining pipe 2 undergoes compression strain smaller than the yield point, so that the outer diameter of the pipe 2 is slightly reduced to produce compression stresses. On the other hand, the annular projections 4a, 4b are pressed with reaction forces Pr. The pressure-sensitive adhesive attached to the inner peripheral surface of the end portion of the pipe 1b is moved into the fine voids among the fibers of the reinforcing cloth 6 by the reaction forces Pr, so that the leakage of the adhesive is prevented since the lubricant has plasticity to the adhesive, it functions to largely help movement of the adhesive into the reinforcing cloth 6.

On the other hand, as the pipe 1a is being engaging with the pipe 1b, the circumscribing reinforcing pipe 3a undergoes pipe-enlarging strains on the outer peripheral surfaces of the pipes 1a and 1b, and the hook-like engaging ring 10 fixed to the tip portion of the pipe 3a is proceeded, while it also undergoes similar strains. AT that time, air sealingly entrapped in a space e" defined between the pipe 1a and 1b, the stopper ring 15, and the engaging ring can be squeezed out through a fine gap between the engaging ring 10 and the (rough) outer peripheral surface of the pipe 1a.

The engaging between the pipes 1a and 1b for the joining is finally finished through insertion when the tip of the engaging ring 10 surrounded with the pressure-sensitive adhesive butts the stopper ring 15. FIG. 2b shows the state where the joining between the pipes 1a and 1b is finished. Although it may happen that the lubricant or the like stays in spaced formed in various locations, for example, a space e", such excess lubricant will be spontaneously flow out through fire gaps.

Figure 3A:
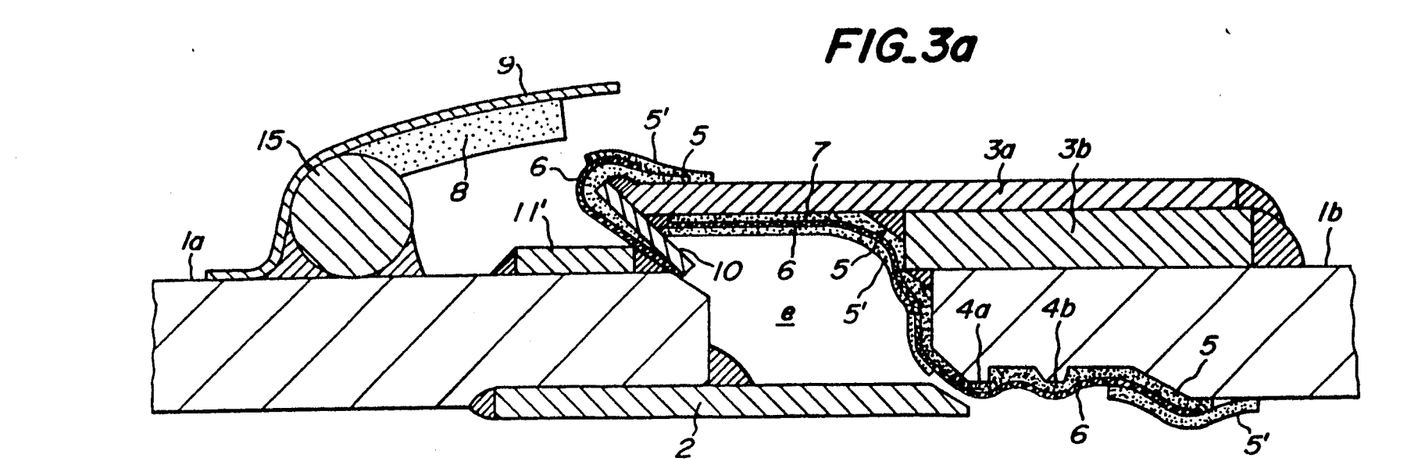
FIG. 3a is a broken sectional view of a part of another pipe joint structure according to the present invention in an enlarged scale before joining.
Figure 3B:
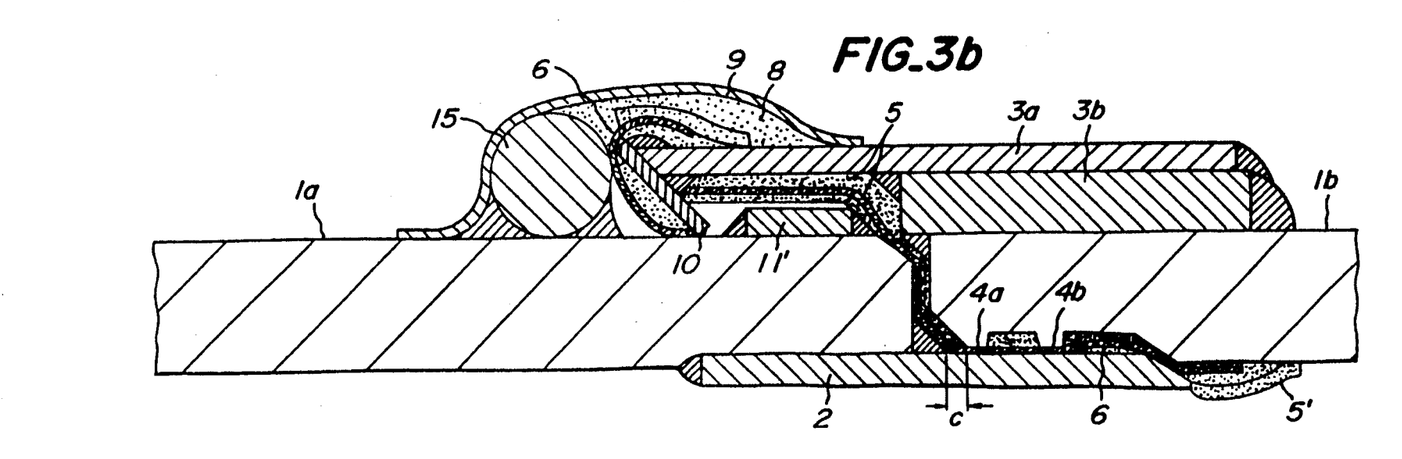
FIG. 3b is a broken sectional view of FIG. 3a in a joined state in an enlarged scale.

When it is anticipated that the space C becomes smaller than as shown in FIG. 3 through expansion of the pipes because the temperature becomes higher than that at the time of the butt joining between the pipes 1a and 1b, the space C must be widened. This case may be coped with a case where a sealing tape having a necessary thickness is interposed between the ends of the pipes 1a and 1b, and a detachable spacer having a given thickness is interposed between the stopper ring 15 and the engaging ring 10. When the joined portion is to be bent at a given angle after the joining, a detachable spacer is attached to that portion of the stopper ring 15 which is located on an outwardly bending side.

When the maximum design pressure Pw is applied to the end portion of each of the joined pipes 1a and 1b constructed as mentioned above, the pipe ordinarily receives the pipe-expanding strain equal to about $\frac{1}{2}$ of the yield point of the pipe, and swells. In this case, since the end portion of the pipe 1a is reinforced with the stopper ring 15, the 11' and the inscribing joint pipe 2, the swelling degree of the end portion of the pipe 1a is smaller than that of the main portion of the pipe. On the other hand, the end portion of the pipe 1b receives the summed pipe-enlarging strain of reaction forces Pr of the compression stresses of the inscribing joining pipe 2 and the inner pressure Pw. However, since the end portion of the pipe 1b is reinforced with the circumscribing reinforcing pipe 3a, 3b so that the pipe-enlarging strain of the end portion of the pipe 1b may be smaller than that of the main bodies of the pipes 1a and 1b, the actually pipe-enlarging strain of the end portion of the pipe 1b is smaller than that of the main bodies of the pipes 1a and 1b. By so constructing, when inscribing joining pipe 2 which receives the compression strain from the annular projections 4a, 4b, receive the internal pressure, some compression strain remains although the compression stress is reduced to a certain degree. When the internal pressure is applied to the pipe 2, that portion of the inscribing joining pipe 2 which is located at the gap C is in a free state undergoing no limitation from the pipe on the side of the outer peripheral surface. Therefore, the load of the compression stress is small there. Accordingly, when the gap C becomes greater through the shrinkage of the pipes 1a and 1b due to changes in temperature or the like, radial compression stress becomes zero at that portion. When the gap C becomes further greater, the inscribing joining pipe 2 is enlarged with the internal pressure Pw so that radial tensile stress acts upon there instead of the compression stress. When the gap C is further enlarged, the tensile stress of the inscribing joint pipe 2 reaches its allowable limit δa. The gap C at that time is taken as the allowable gap Ca. The annular engaging groove 11 and the engaging ring are located to give a gap f therebetween so that the gap C may be smaller than the allowable gap Ca.

Figure 6:
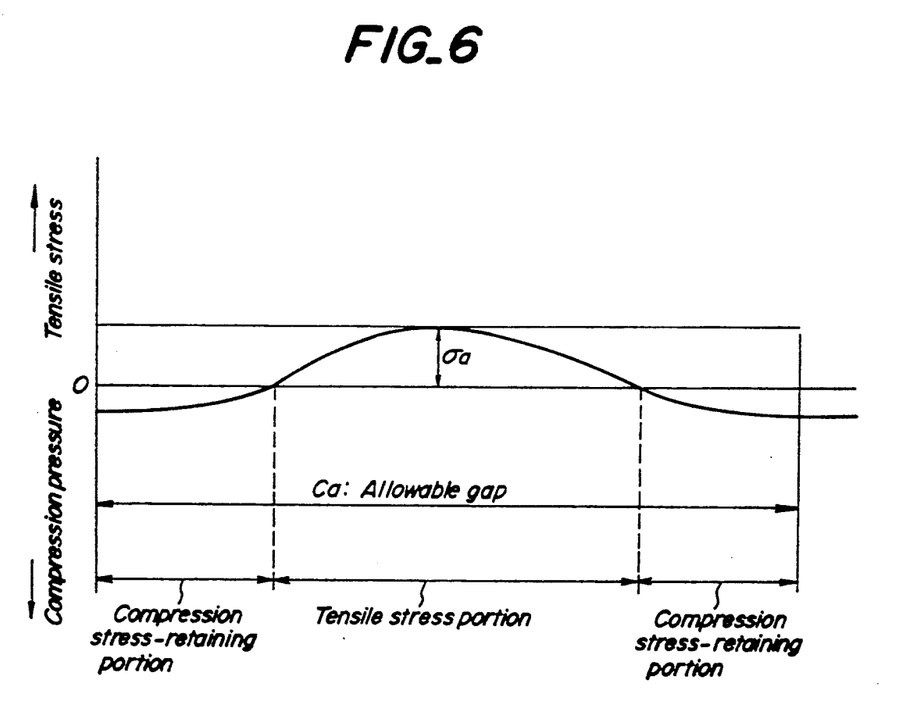
FIG. 6 is a graph showing the distribution of stresses on joined pipes.

That is, the stress of the inscribing joint pipe 2 at the time of the allowable gap Ca is as shown in FIG. 6. As is clear from FIG. 6, since the end portions of the inscribing joint pipe 2 located on both sides of the gap C are fixedly supported under compression stress, compression stress acts on regions extending by a given distance from the both ends.

Regarding this, since the outer cylindrical tube of the conventional mechanical joint is not supported at the both ends, this tube needs to have a thickness equal to or greater than that of the pipe. On the other hand, since the both end portions of gap are fixedly supported under application of compression stress at the both ends in the case of the pipe joint structure according to the present invention, stress is greatly reduced so that the weight of the joining member can be reduced.

This can be explained as follows:

That is, the general formula between the stress and the dimensions in design is expressed by the following relation.

$$f = aP\left(\frac{c}{t}\right)^2 - b \qquad \text{①}$$

wherein f: stress at center of gap, P: internal pressure, C: gap, t: thickness of joining member, b: compression stress (constant determined by intensity of compression stress and reinforced degree of end portion of pipe), and a: constant determined by outer diameter of pipe, a way of fixedly supporting pipe at both ends of gap, etc.

The following are seen from the above expression.

(1) When the pipe joint structure is designed in the anti-vibrating structure, and undergoes no expansion or contraction against earthquake, the maximum expansion-contraction space and gap C can be made smaller. This means that the weight of the pipe joint structure can be made lighter by reducing the thickness t of the inscribing joint pipe 2 with respect to the prescribed allowable stress fa.

(2) When rigidity of the inscribing joining pipe 2 is increased by imparting compression stress upon the inscribing joint pipe 2 and reinforcing the end portions thereof, the value of "b" in the above expression ① can be made greater. This means that the thickness t of the inscribing joint pipe 2 can be reduced.

(3) When the inscribing joining pipe 2 is fixedly supported at the both ends of gap C, the value of "a" can be made smaller. This means that the thickness t of the inscribing joining pipe 2 can be reduced.

(4) When the material of the inscribing joining pipe 2 is a high tensile, high-yield material, the allowable stress "fa" can be raised. This contributes to reduction in weight of the joining member.

With respect to this, in the conventional mechanical joint, since the outer cylinder as the joining member is not supported by the pipe unlike the present invention, the thickness of the outer cylinder cannot be reduced, so that weight reduction cannot be attained, either.

In the present invention, when the flexibility needs to be given to the joint, the expansion-contraction gap C must be made greater to meet this. Even in such a case, the thickness of the inscribing joint pipe can be not greater than 10 mm. On the other hand, the minimum thickness is 3 mm. If it is less than 3 mm, strain unfavorably occurs by welding. When the thickness is 3 to 12 mm, steel plate having super high tension strength, good weldability, and impact strength can be produced at low cost. Such high grade large diameter pipes cannot be produced from a steel pipe having an extremely large thickness. The ultimate tensile strength of the high grade large diameter pipes using such pipes is 620 MPa. With respect to hot strips although 800 MPa high tensile steel is produced by high speed continuous rolling, quenching on hot run table, gradually cooling after coiling (hot rolling, and in-line controlled and auto-temper treatment), the present invention uses super high tensile steel into which a small amount of additives are further incorporated. This super high tensile steel has tensile strength of 1,200 to 1,400 MPa. Its strip is slitted in a given width, which is used in a rounded state in the form of a ring.

In order to sufficiently withstand the shearing tensile forces on press fitting, the pressure-sensitive adhesive is used in the state that it is attached to a high strength material, such as unwoven cloth of nylon or polyester as a substrate 7. As the reinforcing cloth 6, use may be made of a rigid texture into which lubricant can be well impregnated and which has strength enough to sufficiently withstand the shearing tensile forces during the press fitting, for example, such as of polyamide base nylon or polyester. Further, as the lubricant, one having some viscosity to sufficiently exhibit lubricating property as well as Rheology property needs to be used. The lubricant also needs plasticity to the adhesive, and for example, grease or liquid polybutadiene resin may be used therefor.

In the state that the pipes 1a, 1b and the short pipes 2, 3a and 3b are engaged with one another for joining, a part of the lubricant enters the space e' shown in FIG. 3, and the remainder is squeezed out through fine gaps inevitably produced between the engaging ring 10 and the pipe 1a. When the gap C is widened due to lowered atmospheric temperature, the lubricant once squeezed out flows in through the fine gaps again. This is also applicable to a case where the joined pipes undergo gently angular displacement.

However, if the lubricant is rapidly flow out or in through such fine gaps, great viscous resistance occurs. Thus, almost no lubricant will flow against impact displacement such as earthquake, so that the pressure-sensitive adhesive or the lubricant is merely elastically displaced. In this case, the viscoelastic material (Rheological material) converts vibrating energy to heat energy by its internal friction, and dissipates the latter.

FIGS. 3a and 3b illustrate another embodiment in which an engaging ring 11' is fitted around the outer peripheral surface of the pipe 1a at an end portion instead of the annular engaging groove 11 cut in the outer peripheral portion of the pipe 1a in FIGS. 1 through 2. This embodiment is suitable for a case where the end portion of the pipe 1a is further reinforced with the engaging ring 11. In this embodiment, the constituent features are the same in the first embodiment excluding the engaging ring 11'.

Figure 4A:
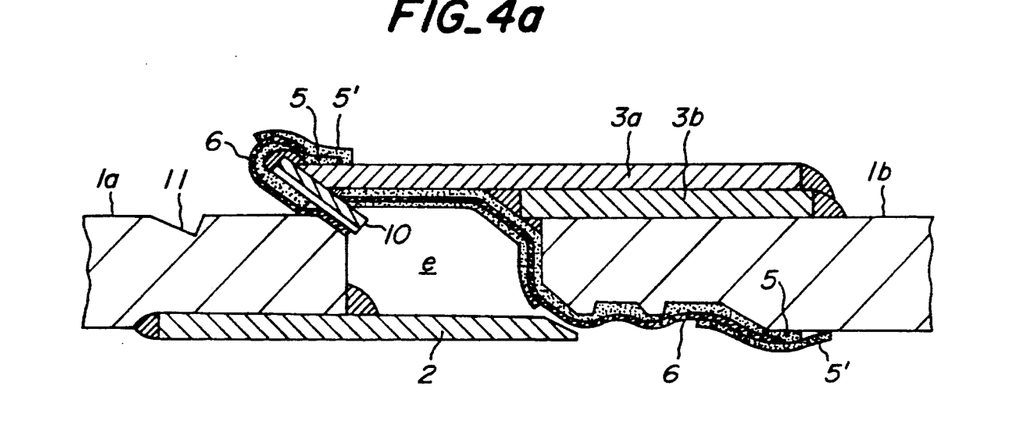
FIG. 4a is a partially broken sectional view of a part of still another pipe joint structure according to the present invention in an enlarged scale.
Figure 4B:
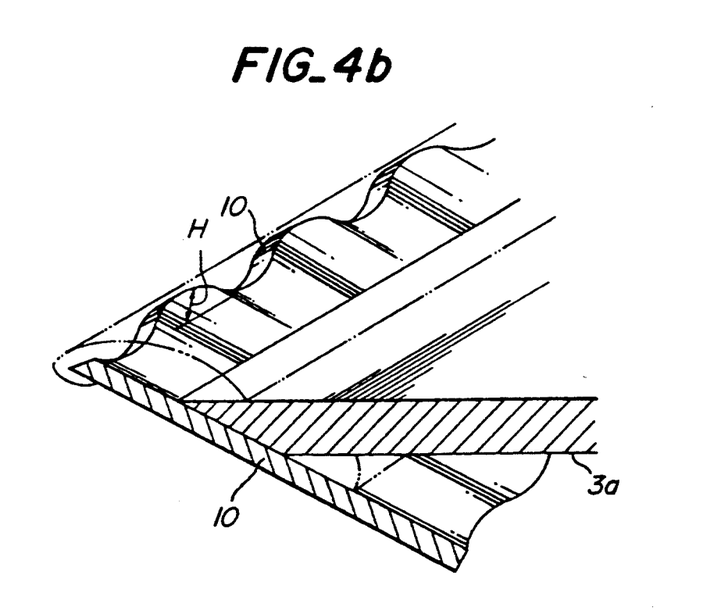

FIGS. 4a and 4b illustrate a still further embodiment according to the present invention, in which an engaging plate is a truncated conical ring corrugated in a circumferential direction as shown in FIG. 4b. The height "H" of the ridges of the corrugated plate is preferably 3 to 6 mm. In this case, when fillet welding is effected between an outwardly projecting portion of the engaging ring 10 and the circumscribing reinforcement pipe 3a as shown by an imaginary line in FIG. 4b, the welding beads penetrate to the rear side of the circumscribing reinforcement pipe 3a. The height H of 3 to 6 mm is considered to effect excellent bead penetration. Thus, the engaging ring 10 can be welded to the circumscribing reinforcement pipe 3a from one side.

Further, when the pipes 1a and 1b are press fitted, air and excess lubricant in the space e between the pipes must be expelled outside. When the engaging ring 10 is corrugated, such expel can easily be effected. In addition, when the engaging ring 10 is corrugated, the outer peripheral length thereof can easily be varied on the press-fitting.

Figure 5:
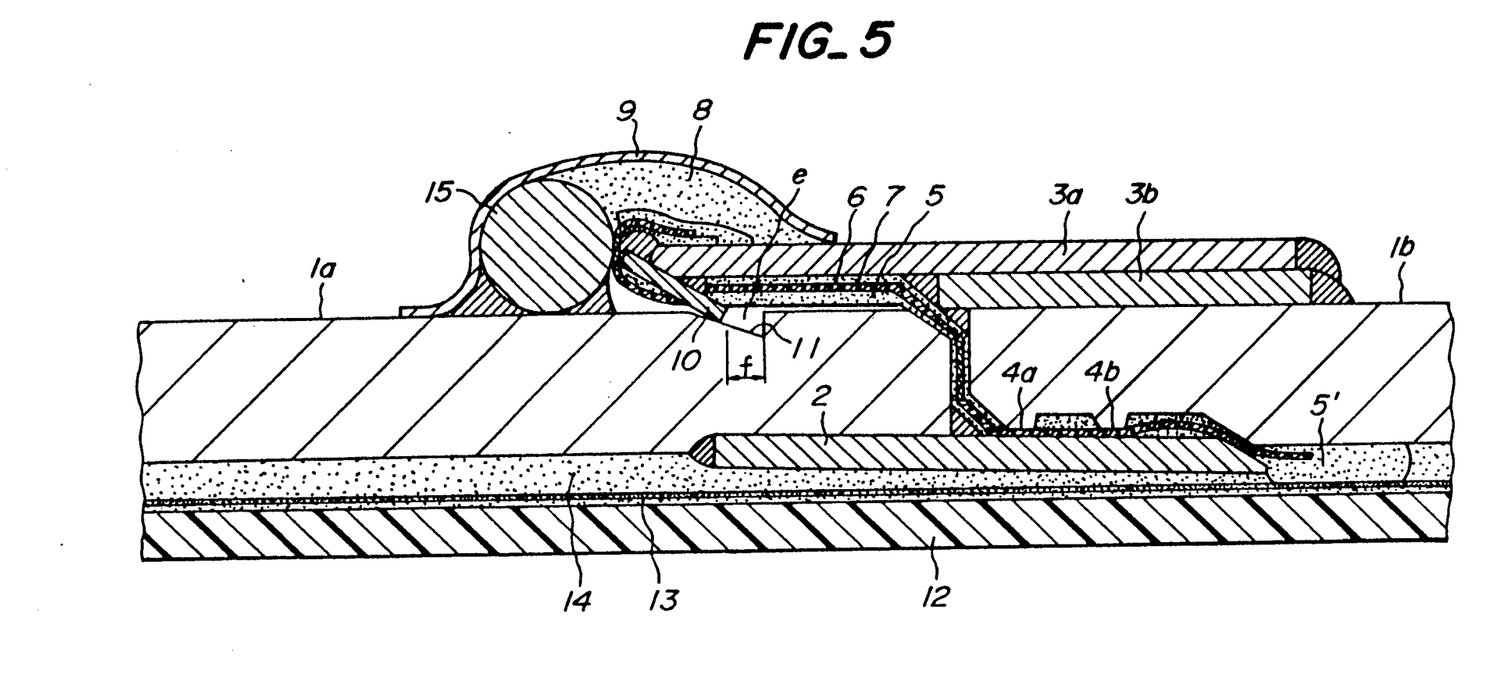
FIG. 5 is a broken sectional view of a part of further pipe joint structure according to the present invention in an enlarged scale in a joined state.

In the joint structure according to the present invention, the inscribing joint pipe 2 and the pressure-sensitive adhesive layer 5 are slightly projected inside the pipes so that they are subjected to corrosion, immersion and abrasion with the fluid passing through the pipes. If the fluid is corrosive or abrasive, the thickness of the pipe must be a sum of a thickness determined in designing for withstanding pressure and a thickness anticipated to be reduced by corrosion and abrasion, i.e. corrosion allowance. However, when the lining is employed as shown in FIG. 5, it is unnecessary to add the corrosion allowance as the thickness of the pipe. In this case, the durable life of the pipeline can be made perpetual. The lining technique in FIG. 5 is a technique disclosed in U.S. Pat. No. 4,962,958 entitled "LINING LAMINATE FOR A PIPELINE" to Norio TAKEI. In this lining, problems anticipated by this projection can be completely eliminated by lining the inner peripheral surface of the pipes with a lining tube 12 through adhering pressure-sensitive adhesive double coated sheet 13 and a woven fabric 14, impregnated with a liquid plasticizer, thereto. By so constructing, the joining pipe 2 and the pipes 1a, 1b may be perpetually prevented from corrosion and abrasion. Since the fabric 14 is designed to freely slide relative to the pipe 1 and the joint pipe 2, the pipes 1, 2 and the fabric 14 can freely slide at the boundary face therebetween even if the expansion-construction gap C becomes larger. Consequently, the lining tube will not locally be extended and broken unlike the prior art. In addition, the lining 14 can easily reduce its thickness, even if the joint pipe 2 projects toward the inside of the pipes, the fabric 14 reduces its thickness accordingly, so that smooth lining surface may be attained. If the lining tube is abraded, it can be drawn out, and exchanged with a fresh one.

Next, the method of joining the above pipes 1a and 1b will be explained.

The joining of the pipes having the above-mentioned pipe joint structures needs not troublesome operation of tightening numerous bolts and nuts as in the case of the conventional mechanical joint, but the joining between them can be effected merely by butting and axially pressing them together. Therefore, pipes 1a, ..., 1x to be joined are placed in a construction line with their axes being aligned together while they are lightly contacted together. A number of pipes thus lightly contacted in the construction line are connected once by pressing and engaging relative to one another with jacks.

For example, assume that the length of a press fitted length of a joint at one location is 40 mm and that 100 pipes are placed to be pressed once by using jacks. The jack needs to be advanced by 40 mm × 100 = 4000 mm for 100 joints. Since the speed of the jack can be set at 500 mm/minutes, the pipes can be press fitted through 100 joints in 8 minutes (= 4000 mm/500 mm) (One joint needs a fitting time of 8 × 60/100 = 4.8 seconds).

FIG. 7 shows a concept diagram illustrating the above joining. That is, the pipes 1a, ... are successively placed on rollers 16 in a construction line, while the pipes are manually aligned and lightly contacted with one another. Then, a wire-fixing member 17 is detachably fitted to the projecting portion of the circumscribing reinforcing pipe 3, as an anti-slipper, of a reference pipe 1a fixed to the ground or the like. One ends of jack-dragging wires 18 are fixed to the wire-fixing member 17. Thereafter, a jack-fitting member 19 is fitted to a pipe 1x on the side of the other ends of the wires, and one to plural jacks 20 for jack-sliding construction are attached thereto upon necessity. This jack is designed to draws in the wire 18 by using hydraulic pressure operated.

When a bent portion is present on the midway of a pipe line, it is preferable that a bent pipe "1d" is fixed to the ground or the like, and pipes to be joined are joined to opposite ends of the bent pipe.

Figure 8:
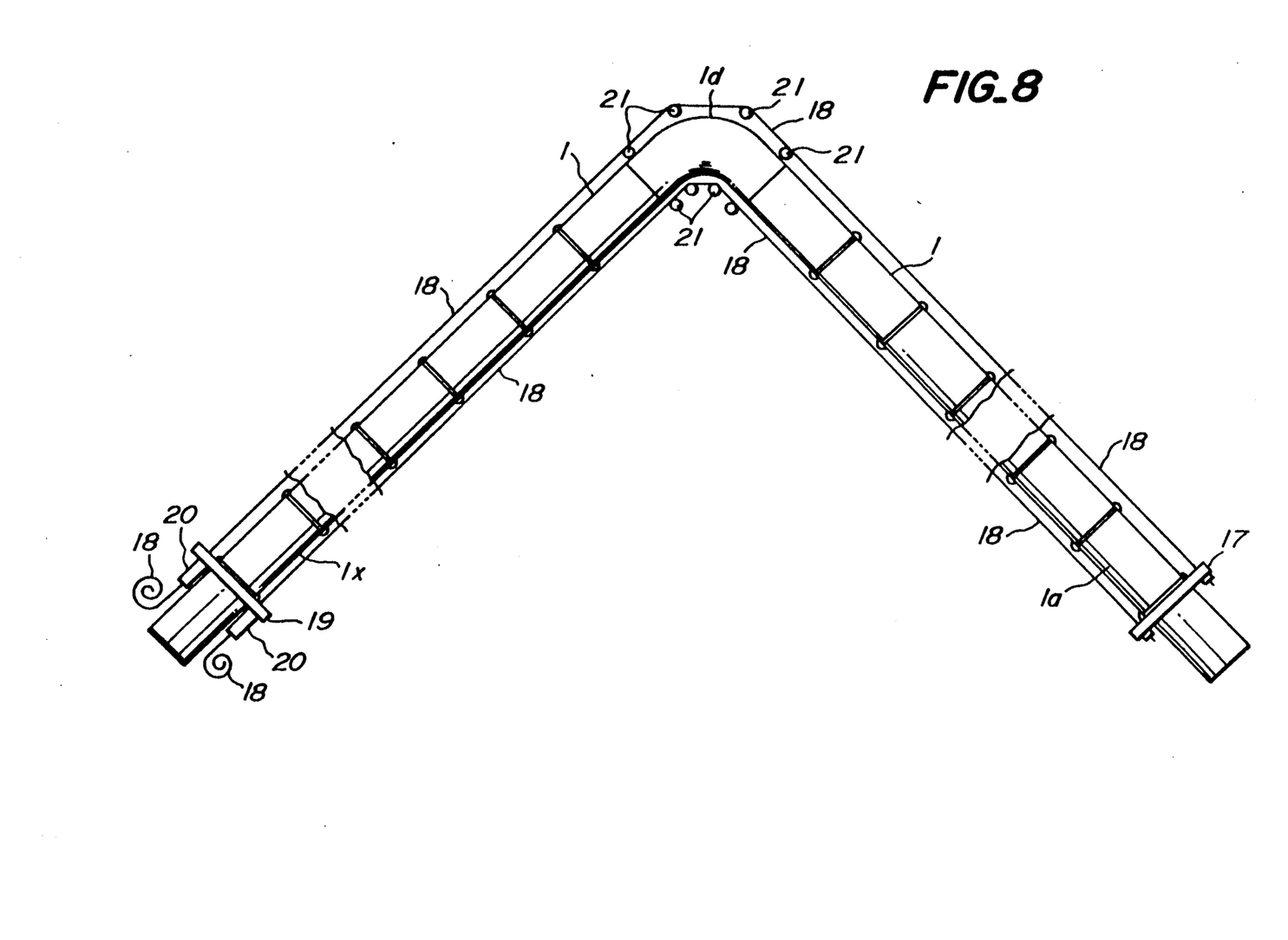

FIG. 8 is a view for illustrating a case where numerous pipes 1a, ... 1x inclusive of such a bent pipe 1d are placed along a construction line while they are lightly touched with one another, and then the pipes are once joined. The pipes to be joined are first placed on rollers and brought into light contact with one another on each of the opposite sides of the bent pipe "1d", while they are coaxially aligned. Then, the wire-fixing member 17 is fixedly fitted to the pipe 1a thus placed on one end for fixing tips of jack-dragging wires 18. The wires 18 are extended along the pipes on one side of the pipe "1d", and curved along the bent shape of the pipe "1d" through guide rollers 21 fixed to the ground or the like. The wires are extended up to the pipe 1x at the terminal of the line. Then, the jack-fixing member 19 and the jacks 20 are fitted to the pipe 1x, by which the wires 18 are dragged to connect the pipes once.

The present invention constructed as mentioned above has the following effects.

(1) Since the joint structure has a reduced weight and a simple structure making it easy to automatically work in the factory, the factory production cost is greatly reduced. In particular, since the joined portion has the anti-vibration structure, the expansion-contraction gap can largely be reduced. Therefore, the joint may bear only the inner pressure and the outer pressure applied to this expansion-contraction gap.

Further, since the main member (the inscribing joint pipe) of the joint structure is preliminarily fixed to the end of the pipe in the form of the end-fixed type support, the load (the inner and outer pressures) applied to the joint structure can also be borne by the end portions of the pipes. In addition, the joint structure is constructed such that the stresses are produced in directions reverse to those of the inner and outer pressures against the load applied on engagement under pressure, the joint structure not only becomes tight, but also readily follow vibrations. Therefore, the joint structure has excellent flexibility as the pipe joint.

(2) Since the joining can be effected at the construction site by the simple operation that the pipes are merely engaged under pressure, a number of the pipes can be joined together once by the jacks only, so that the working time at the construction site can be largely shortened.

(3) Since the fluid or the earth and sand will not enter the sealed portion, the sealed portion undergoes neither rusting nor damages with the earth and sand, so that it is free from reduction in the sealability.

(4) Since the joint structure is designed as the anti-vibration structure, the joints are not disassembled on earthquakes.

What is claimed is:

1. A pipe joint structure comprising first and second pipes 1a and 1b to be joined, an inscribing joint pipe 2 secured to an inner peripheral surface at an end portion of said first pipe 1a, one end of the inscribing joint pipe 2 being projected slightly axially outwardly from the axial end of the first pipe 1a, a stopper ring 15 secured to the outer peripheral surface of the first pipe at a location slightly spaced from the axial end thereof, means 11, 11' providing an annular engaging surface on the outer peripheral surface near the stopper ring and between the stopper ring and said axial end of the first pipe 1a, said annular engaging surface 11, 11' facing the stopper ring 15, a circumscribing reinforcing pipe 3a, 3b secured to an outer peripheral surface at an end portion of the other pipe 1b to be joined, an end portion of the circumscribing reinforcing pipe 3a, 3b being projected slightly axially outwardly from the axial end of the other pipe 1b, the circumscribing reinforcing pipe being provided with an engaging ring 10 at its tip end portion to engage said annular engaging surface 11, 11' to join the pipes 1a and 1b together, a plurality of annular projections formed on the inner peripheral surface of the other pipe 1b near the axial end thereof, a cover tape 9 being provided around the outer periphery of the pipe 1a from the stopper ring 15 toward the end thereof, said cover tape being attached with a pressure-sensitive adhesive 8, a pressure-sensitive adhesive layer 5 and a reinforcing cloth 6 attached to the inner peripheral surface of the pipe 1b inclusive of the circumscribing reinforcing pipe 3a, 3b from the engaging ring 10 at the circumscribing reinforcing pipe 3a, 3b to the annular projections 4a, 4b, and the reinforcing cloth 6 being impregnated with a lubricant imparting plasticity to the pressure-sensitive adhesive, whereby when the pipes are joined, the pressure-sensitive adhesive layer 5 and the reinforcing layer 6 are interposed between joining surfaces of the pipe 1a, 1b joined through the circumscribing reinforcing pipe 3a, 3b and the inscribing joining pipe 2 and the cover tape 9 and pressure-sensitive adhesive layer 8 are adhesively attached to the circumscribing reinforcing pipe 3a.

2. The pipe joint structure according to claim 1, wherein the outer diameter of the inscribing joining pipe 2 of the pipe 1a is made slightly larger than the inner diameter of the annular projections 4a, 4b of the pipe 1a.

3. The pipe joint structure according to claim 1, wherein the positional relation between the engaging ring 10 and the stopper ring is so set that the engaging between the pipes 1a and 1b for the joining is finally finished through insertion when the engaging ring 10 surrounded with the pressure-sensitive adhesive bears against the stopper ring 15.

4. The pipe joint structure according to claim 1, wherein the stopper ring 10 is a truncated conical ring corrugated in a circumferential direction thereof.

* * * * *